(12) United States Patent
Ann et al.

(10) Patent No.: US 10,271,009 B2
(45) Date of Patent: *Apr. 23, 2019

(54) METHOD AND APPARATUS FOR PROVIDING ADDITIONAL INFORMATION OF VIDEO USING VISIBLE LIGHT COMMUNICATION

(71) Applicant: Samsung Electronics Co., Ltd., Gyeonggi-do (KR)

(72) Inventors: Jong-Hoon Ann, Gyeonggi-do (KR); Eun-Tae Won, Seoul (KR); Jae-Seung Son, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 58 days.

This patent is subject to a terminal disclaimer.

(21) Appl. No.: 14/598,579

(22) Filed: Jan. 16, 2015

(65) Prior Publication Data

US 2015/0124173 A1    May 7, 2015

Related U.S. Application Data

(63) Continuation of application No. 12/319,441, filed on Jan. 7, 2009, now Pat. No. 9,031,376.

(30) Foreign Application Priority Data

Jan. 7, 2008    (KR) .................. 10-2008-0001757

(51) Int. Cl.
*H04N 7/08* (2006.01)
*H04N 7/025* (2006.01)
(Continued)

(52) U.S. Cl.
CPC ............ *H04N 7/08* (2013.01); *H04B 10/116* (2013.01); *H04N 5/44508* (2013.01);
(Continued)

(58) Field of Classification Search
CPC ............ H04N 7/025; H04N 21/23412; H04N 21/234318; H04N 21/235; H04N 21/435;
(Continued)

(56) References Cited

U.S. PATENT DOCUMENTS 5,940,139 A * 8/1999 Smoot ................ H04N 5/272
348/584
6,344,879 B1 * 2/2002 Kim ................. H04N 1/00291
348/553
(Continued)

FOREIGN PATENT DOCUMENTS

JP    2004-072365 A    3/2004
JP    2007-135078 A    5/2007

*Primary Examiner* — Thai Q Tran
*Assistant Examiner* — Jose M Mesa
(74) *Attorney, Agent, or Firm* — Cha & Reiter, LLC.

(57) ABSTRACT

A method and apparatus for providing additional information included in a video displayed on a display device using visible light communication (VLC). A data packet including video data and additional information for an object included in the video data is received. The video data is extracted from the data packet, and the video data is decoded. The additional information from the data packet is extracted, and the additional information decoded. The decoded video data is output through the display device, and at the same time, the additional information is transmitted for a particular object included in a video based on a VLC protocol using a light emitting device prepared in the display device. The additional information providing apparatus includes an
(Continued)

image sensor module, a display module, a visible light receiving module, an additional information manager and a controller.

16 Claims, 6 Drawing Sheets

(51) Int. Cl.
| | |
|---|---|
| *H04N 21/235* | (2011.01) |
| *H04N 21/8545* | (2011.01) |
| *H04B 10/116* | (2013.01) |
| *H04N 21/4725* | (2011.01) |
| *H04N 21/234* | (2011.01) |
| *H04N 21/2343* | (2011.01) |
| *H04N 21/41* | (2011.01) |
| *H04N 21/435* | (2011.01) |
| *H04N 21/81* | (2011.01) |
| *H04N 21/858* | (2011.01) |
| *H04N 5/445* | (2011.01) |
| *H04N 21/434* | (2011.01) |

(52) U.S. Cl.
CPC ........... *H04N 7/025* (2013.01); *H04N 21/235* (2013.01); *H04N 21/23412* (2013.01); *H04N 21/234318* (2013.01); *H04N 21/4122* (2013.01); *H04N 21/4126* (2013.01); *H04N 21/435* (2013.01); *H04N 21/4348* (2013.01); *H04N 21/4725* (2013.01); *H04N 21/8133* (2013.01); *H04N 21/8545* (2013.01); *H04N 21/8583* (2013.01); *H04N 21/8586* (2013.01)

(58) Field of Classification Search
CPC ........... H04N 21/8133; H04N 21/8545; H04N 21/4126; H04N 7/08; H04B 10/116
USPC ......................................................... 386/248
See application file for complete search history.

(56) References Cited

U.S. PATENT DOCUMENTS

| | | | |
|---|---|---|---|
| 7,139,626 B2 | 11/2006 | Kataoka | |
| 7,545,440 B2* | 6/2009 | Kim | ........ H04H 20/53 348/461 |
| 2003/0171096 A1* | 9/2003 | Ilan | ........ G06Q 30/02 455/3.06 |
| 2006/0056855 A1 | 3/2006 | Nakagawa et al. | |
| 2007/0024571 A1* | 2/2007 | Maniam | ........ H04B 10/116 345/102 |
| 2007/0152949 A1 | 7/2007 | Sakai | |
| 2008/0015869 A1 | 1/2008 | Kim et al. | |
| 2008/0043218 A1 | 2/2008 | Murayama | |
| 2008/0066129 A1* | 3/2008 | Katcher | ........ G06F 17/30855 725/109 |
| 2008/0094244 A1 | 4/2008 | Oh et al. | |
| 2008/0282297 A1* | 11/2008 | Park | ........ H04N 7/17318 725/86 |
| 2009/0142068 A1 | 6/2009 | Takahashi et al. | |
| 2009/0274378 A1 | 11/2009 | Fukuhara et al. | |

* cited by examiner

METHOD AND APPARATUS FOR PROVIDING ADDITIONAL INFORMATION OF VIDEO USING VISIBLE LIGHT COMMUNICATION

CLAIM OF PRIORITY

This application is a Continuation of U.S. patent application Ser. No. 12/319,441 filed on Jan. 7, 2009 which claims the benefit under 35 U.S.C. § 119(a) of a Korean Patent Application filed in the Korean Intellectual Property Office on Jan. 7, 2008 and assigned Serial No. 10-2008-1757, the disclosure of which is incorporated herein by reference in its entirety.

BACKGROUND

1. Field of the Invention

The present invention relates generally to a method and apparatus for playing back a video. More particularly, the present invention relates to a video playback method and apparatus capable of providing additional information included in a video to a plurality of users individually.

2. Description of the Related Art

Digital Multimedia Broadcasting (DMB) is one of the services that provide video data over portable terminals. DMB, which may provide stream-type broadcast signals, can also broadcast DMB signals, to which MPEG-4 Binary Format for Scenes (BIFS) is applied, at the DMB broadcasting station. The term 'MPEG-4 BIFS', as used herein, refers to an MPEG-4 scene description. DMB provides MPEG-4 BIFS as auxiliary data (or additional information) in addition to an audio/video stream, and BIFS composes a scene in units of objects and supports a particular one of BIFS nodes, which responds to a user's input so that the user can click menus and buttons while viewing contents, thereby enabling interactive communication.

Generally, MPEG-4 refers to a digital bit stream protocol for encoding audio data, video data and objects, and means a standard capable of digitally describing and delivering various multimedia contents. Since MPEG-4 is an object-based description system, there is a need for scene description information for making or composing each scene.

Such scene description information is referred to as Binary Format for Scenes (BIFS). Herein, BIFS refers to an MPEG-4 scene description protocol, and it means information used for making MPEG-4 objects, describing an interface with the MPEG-4 objects, moving the MPEG-4 objects, and composing/mixing the MPEG-4 objects to allow them to interact with each other. Therefore, a DMB receiver, which receives the MPEG-4 BIFS-based DMB data, can receive objects constituting DMB contents, compose a scene using them according to BIFS, and provide the scene to the user.

Accordingly, MPEG-4 BIFS-based DMB service can be provided to a personal portable terminal so that the user can click menus and buttons while viewing the contents.

However, there is a problem in that when the MPEG-4 BIFS-based DMB service is provided to a large-sized display device such as a large-sized electric bulletin board aimed at providing information to a plurality of users, there is difficulty in realizing the environment where the plurality of users can select their own desired objects individually through the large-sized display device. Further, there also is difficulty in implementing the environment that individually provides particular data the plurality of users want.

SUMMARY

An aspect of the present invention is to provide a method and apparatus for providing a video to a plurality of users, and individually providing additional information an individual wants, using a display device supporting visible light communication.

According to one exemplary aspect of the present invention, there is provided a method for providing additional information included in a video displayed on a display device using visible light communication (VLC). The method includes (a) receiving a data packet including video data and additional information for an object included in the video data; (b) extracting the video data from the data packet, and decoding the video data; (c) extracting the additional information from the data packet, and decoding the additional information; and (d) outputting the decoded video data through the display device, and at the same time, transmitting additional information for a particular object included in a video based on a VLC protocol using a light emitting device prepared in the display device.

Preferably, in the present invention the light emitting device can be a light emitting device prepared in a region where a particular object included in a video is placed, and the additional information is additional information associated with the particular object.

Preferably, in the present invention the data packet further may include audio data, and the method further includes extracting the audio data from the data packet and decoding the audio data.

Preferably, in the present invention the method further includes (e) receiving a visible light signal emitted from a light emitting device in a region where the particular object is situated; (f) displaying an optical signal in a wavelength band, emitted by a light emitting device prepared in a region where the object is located, using a display of a reception apparatus; and (g) extracting the additional information transmitted from the light emitting device in the region where the particular object is placed, and providing the extracted additional information.

Preferably, the step (g) may further include storing the extracted additional information in a memory.

Preferably, the step (g) may include generating a list of a plurality of the extracted additional information; displaying the additional information list; receiving selected additional information included in the additional information list; and displaying detailed information included in the selected additional information.

Preferably, the step (c) may further include requesting and acquiring the additional information selectively.

According to another exemplary aspect of the present invention, there is provided a method for providing additional information included in a video by a mobile terminal supporting visible light communication (VLC). The method includes (a) displaying video data, and at the same time, receiving a visible light signal emitted from a display device that transmits additional information for a particular object included in a video based on a VLC protocol; (b) displaying an optical signal in a wavelength band, emitted by a light emitting device prepared in a region where the object is placed, using a display of the mobile terminal; and (c) extracting the additional information transmitted from the light emitting device in the region where the particular object is located, and providing the extracted additional information.

Preferably, the step (c) may further include storing the extracted additional information in a memory.

Preferably, the step (c) may include generating a list of a plurality of the extracted additional information; displaying the additional information list; receiving selected additional information included in the additional information list; and displaying detailed information included in the selected additional information.

According to another exemplary aspect of the present invention, there is provided an apparatus for transmitting additional information included in a video using visible light communication (VLC). The apparatus includes a demultiplexer for separating video data and data including additional information associated with a particular object included in the video data, from a data packet received from an exterior; a video decoder for restoring a video by decoding the video data; a display device for displaying the restored video through a plurality of light emitting devices; a data decoder for restoring the data including the additional information; and a visible light communication device for transmitting the additional information associated with the particular object using a light emitting device prepared in the display device based on a VLC protocol.

Preferably, the visible light communication device will transmit the additional information associated with the particular object using a light emitting device prepared in a region where a particular object included in a video.

Preferably, the apparatus further includes an audio decoder for restoring an audio signal by decoding audio data; and a speaker for outputting the restored audio signal.

According to yet another exemplary aspect of the present invention, there is provided an apparatus for receiving additional information included in a video from a display device for displaying the video using a plurality of light emitting devices, and providing the received additional information. The apparatus includes an image sensor for receiving a visible light signal emitted from a light emitting device prepared in the display device, and converting the received visible light signal into an electric signal; a visible light receiving module for acquiring data from a signal output from the image sensor based on a visible light communication (VLC) protocol; an additional information manager for extracting additional information associated with a particular object of the video data from the data acquired by the visible light receiving module; and a display module for displaying a color-difference signal in a wavelength band corresponding to a visible light signal received from the image sensor and information provided from the additional information manager.

Preferably, in the present invention the apparatus further includes a memory for storing the extracted additional information.

Preferably, in the present invention the additional information manager generates a list of a plurality of the extracted additional information, and displays the generated additional information list.

Preferably, in the present invention the apparatus further includes an external input interface for receiving selected additional information included in the additional information list.

BRIEF DESCRIPTION OF THE DRAWINGS

The above and other exemplary aspects, features and advantages of the present invention will become more apparent from the following detailed description when taken in conjunction with the accompanying drawings in which.

DETAILED DESCRIPTION

Preferred exemplary embodiments of the present invention will now be described in detail with reference to the annexed drawings. The matters defined in the description such as a detailed construction and elements are provided to assist in a comprehensive understanding of exemplary embodiments of the invention. Accordingly, those of ordinary skill in the art will recognize that various changes and modifications of the exemplary aspects of the present invention described herein can be made without departing from the spirit of the invention and the scope of the appended claims.

The present invention provides a method and apparatus for providing additional information associated with an object that a user has an interest in on the screen he or she is viewing, to a plurality of users by means of visible light communication. In a DMB service involving the general BIFS, the user selects an object included in a video, performs a separate interaction with the selected object, and acquires additional information depending on the information included in an MPEG Transport Stream (TS) or a location of the information indicating it. However, an apparatus that provides a video to a plurality of users, cannot perform an interaction requested by each of the plurality of users. Therefore, the present invention provides a method and apparatus for acquiring additional information previously regardless of the interaction, and providing the additional information using visible light communication.

To implement an exemplary embodiment of the present invention, an apparatus for transmitting additional information of a video includes a large-sized display device that displays a video for a plurality of users, and an apparatus for providing additional information of a video includes a portable terminal (e.g., mobile communication terminal) carried by a user who views the video through the large-sized display device.

Figure 1:
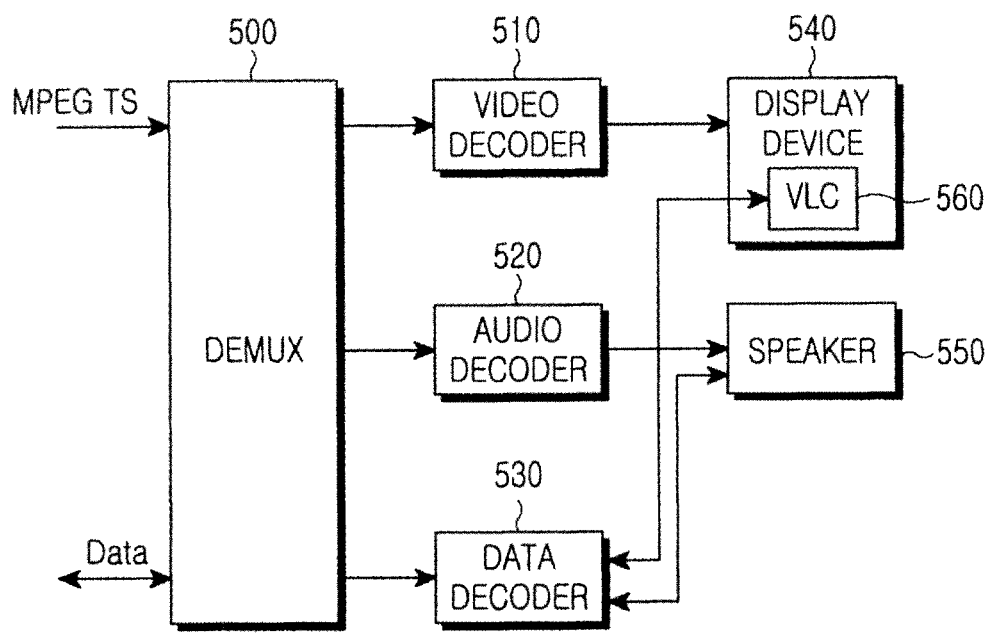
FIG. 1 is a block diagram illustrating a structure of an exemplary apparatus for transmitting additional information of a video according to an embodiment of the present invention.

FIG. 1 is a block diagram illustrating an exemplary structure of an apparatus for transmitting additional information of a video according to an exemplary embodiment of the present invention. Referring to FIG. 1, the additional information transmission apparatus includes a demultiplexer (DEMUR) 500, a video decoder 510, an audio decoder 520, a data decoder 530, a display device 540, a speaker 550, and a visible light communication (VLC) device 560.

The demultiplexer 500 separates from an MPEG TS received from the exterior a video data stream, an audio data stream and a data stream with additional information included in the video or audio data.

The video decoder 510 generates a video signal by decoding the video data stream according to the MPEG video coding standard, and the audio decoder 520 generates an audio signal by decoding the audio data stream according to the MPEG audio coding standard. Although the audio/video decoding is achieved herein based on the MPEG coding standard by way of example, the scope of the present invention in no way limited to the MPEG coding standard as other coding standards can be used.

The data decoder 530 decodes the data stream into data with additional information included in the audio/video data, and provides it to the visible light communication device 560. The additional information includes information on at least one object included in the video. For example, the additional information can involve an identifier indicating a video frame where an object is included, information on a location where the object is prepared in the video frame, an identifier of the object, a name of the object, and detailed information of the object.

The display device 540 displays the video signal output from the video decoder 510. The display device 540 includes, for example, a plurality of light emitting devices. Each pixel prepared in the display device 540 can include light emitting devices capable of expressing lights in a visible-light wavelength band. Preferably, the light emitting devices can include Light Emitting Diodes (LEDs) that emit a Red (R) light, a Green (G) light and a Blue (B) light. Further, the light emitting devices are mounted in the display device 540 generally composed of a TFT-LCD, as a backlight unit, and those can be LEDs which can be on/off-controlled.

The speaker 550 outputs the audio signal decoded by the audio decoder 520.

The visible light communication device 560 transmits the additional information output from the data decoder 530 based on a visible light communication (VLC) protocol. Based on an identifier indicating a video frame in which an object included, information on the location where the object is prepared in the video frame, and an identifier of the object, all of which are included in the additional information, the visible light communication device 560 transmits the additional information by the medium of the light emitting devices prepared in the region corresponding to the location of the object.

Figure 2:
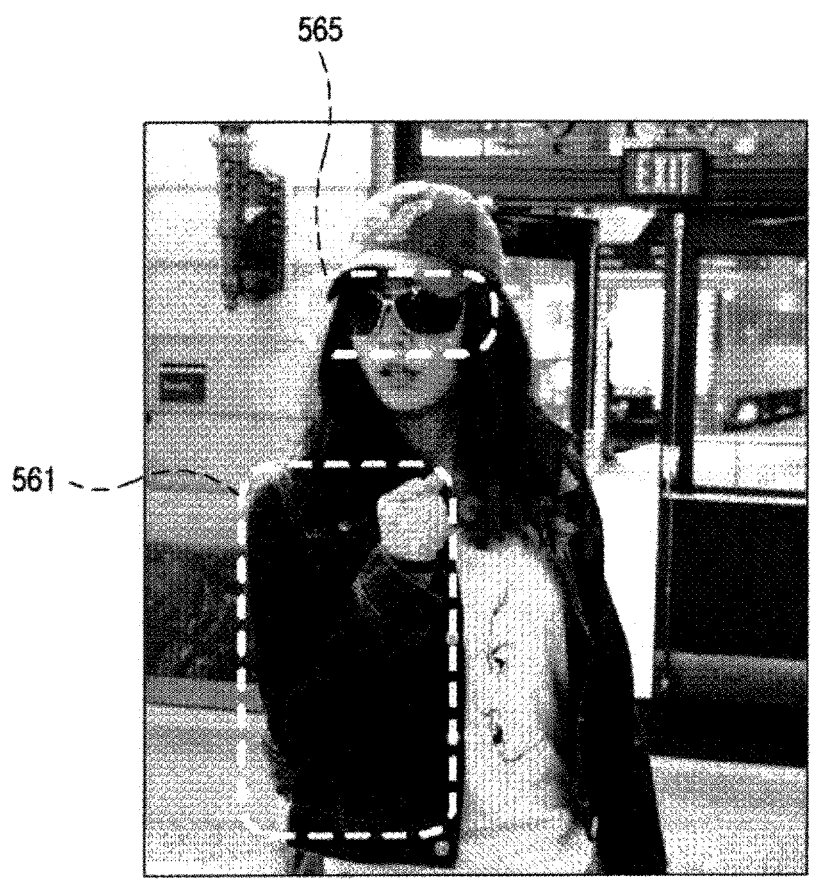
FIG. 2 is a diagram illustrating an exemplary video displayed on a display device in an additional information transmission apparatus according to an exemplary embodiment of the present invention.

FIG. 2 is a diagram illustrating an exemplary video displayed on a display device according to an embodiment of the present invention. Referring to FIG. 2, the display device 540 displays a video frame including a person with a jacket and sunglasses, through light emitting devices included therein. According to the present invention, in the video frame, the jacket and sunglasses can be designated as objects, and the visible light communication device 560 delivers a signal VLC-modulated by a VLC protocol to the light emitting devices prepared in regions 561 and 565 where the jacket and sunglasses are placed in the video frame. Then, the light emitting devices in the regions where the jacket and sunglasses are placed will transmit additional information associated with the corresponding objects.

Figure 3:
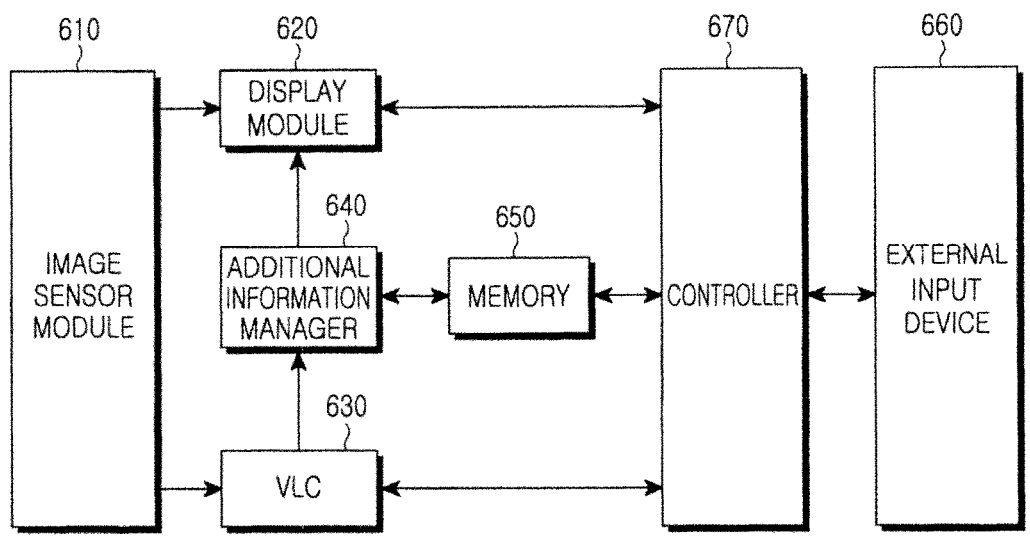
FIG. 3 is a block diagram illustrating a structure of an apparatus for providing additional information of a video according to an exemplary embodiment of the present invention.

FIG. 3 is a block diagram illustrating an exemplary structure of an apparatus for providing additional information of a video according to an exemplary embodiment of the present invention. Referring to FIG. 3, the additional information providing apparatus includes an image sensor module 610, a display module 620, a visible light receiving module 630, an additional information manager 640 and a controller 670.

The image sensor module 610 preferably includes a plurality of image sensors for converting an optical signal in a visible-light wavelength band into an electric signal.

The display module 620 preferably converts the signal converted through the plurality of image sensors prepared in the image sensor module 610 into an optical signal in a visible-light wavelength band, and displays it thereon.

The visible light receiving module 630 preferably acquires data transmitted through visible light communication by applying to a VLC protocol the signal received through the plurality of image sensors prepared in the image sensor module 610. The data transmitted through visible light communication can include, for example, the additional information. For example, the additional information can be BIFS information defined by MPEG.

The additional information manager 640 receives the additional information acquired by the visible light receiving module 630, and generates a list of the additional information.

The additional information providing apparatus can further include, for example, a memory 650 for storing information related to overall functions of the additional information providing apparatus. The additional information manager 640 stores in the memory 650 the list of additional information and the additional information provided from the visible light receiving module 630. The additional information manager 640 provides the list of additional information to the display module 620.

Preferably, the additional information providing apparatus can further include an external input device 660, which is provided as a device for interfacing with the user. The external input device 660 preferably comprises a device for outputting keys prepared in an external portion of the additional information providing apparatus, and outputting unique key input data in response to entry of the keys. A person of ordinary skill in the art can understand and appreciate that the external input device could also comprises a touchscreen without physical keys, and may include a module for audible input, for example, using voice commands.

The controller 670 preferably controls the overall operation of the devices prepared in the additional information providing apparatus. In particular, the controller 670 checks a type of the key input data from the external input device 660, and then performs an operation corresponding to the check result. For example, when a list of the additional information provided by the additional information manager 640 is displayed through the display module 620, the user can select any additional information from the additional information list by means of the external input device 660. At this point, the controller 670 checks a type of the key input data from the external input device 660, extracts additional information stored in the memory 650 according to the check result, and displays it through the display module 620.

The additional information providing apparatus can be provided to a common mobile communication terminal supporting audio/video communication, and the mobile communication terminal can be implemented such that it can perform an operation of the additional information providing apparatus while performing a normal mobile communication service-related operation.

Figure 4:
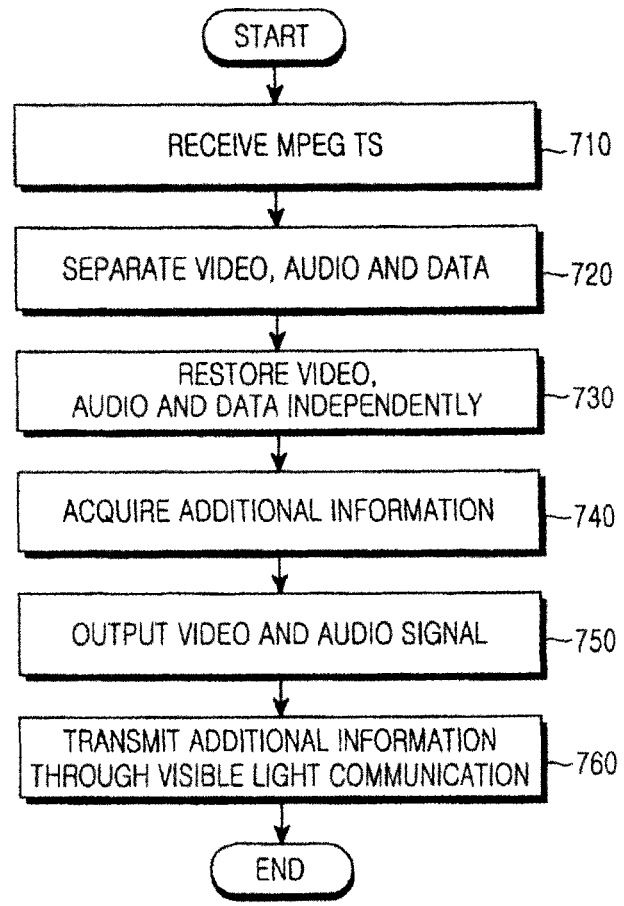
FIG. 4 is a flowchart illustrating a method for transmitting additional information of a video according to an exemplary embodiment of the present invention.

With reference to the foregoing components and the exemplary flowchart shown in FIG. 4, an exemplary description will now be made of a process of transmitting additional information of a video in an additional information transmission apparatus according to an exemplary embodiment of the present invention.

In step 710, the additional information transmission apparatus receives an MPEG TS from the exterior.

In step 720, the demultiplexer 500 separates (demultiplexes) the received MPEG TS into a video data stream, an audio data stream and a data stream according to a predetermined format.

Next, in step 730, the additional information transmission apparatus restores the video data stream, the audio data stream and the data stream independently. To be specific, the video decoder 510 restores the compressed video data stream in the MPEG TS into its original video signal, and the audio decoder 520 restores the compressed audio data stream in the MPEG TS into its original audio signal. Further, the data decoder 530 restores the compressed data stream in the MPEG TS into its original data with additional information.

In step 740, the additional information transmission apparatus acquires additional information that it will transmit through a display device. Specifically, the data with the additional information, restored by the data decoder 530, is delivered to the visible light communication device 560. The visible light communication device 560 converts the data with the additional information into a transmission packet based on the VLC protocol.

Preferably, the additional information can include an identifier indicating a video frame where an object is included, information on a location where the object is prepared in the video frame, and an identifier of the object.

The additional information can be, for example, such information as a Uniform Resource Locator (URL) indicating a location where information on the object is stored. In this case, step 740 further includes a process of requesting and acquiring information on the object from the location where the information on the object is stored, i.e., acquiring the information including an identifier indicating a video frame where the object is included, information on a location where the object is prepared in the video frame, and an identifier of the object.

In step 750, out of the restored signals, the video signal is delivered to the display device 540 while the audio signal is delivered to the speaker 550.

Next, in step 760, the visible light communication device 560 transmits the converted transmission packet through light emitting devices prepared in the display device 540 taking into account a location of the object, included in the additional information. For example, when the display device 540 displays the video of FIG. 2, the visible light communication device 560 receives additional information for each of the jacket and sunglasses designated as objects, and generates transmission packets for their associated additional information, respectively. The visible light communication device 560 checks from the additional information a region 561 where the jacket designated as an object is placed in the video, and then transmits a transmission packet through light emitting devices prepared in the region 561. Similarly, the visible light communication device 560 checks a region 565 where the sunglasses designated as an object is situated in the video, and transmits a transmission packet through light emitting devices prepared in the region 565.

Figure 5:
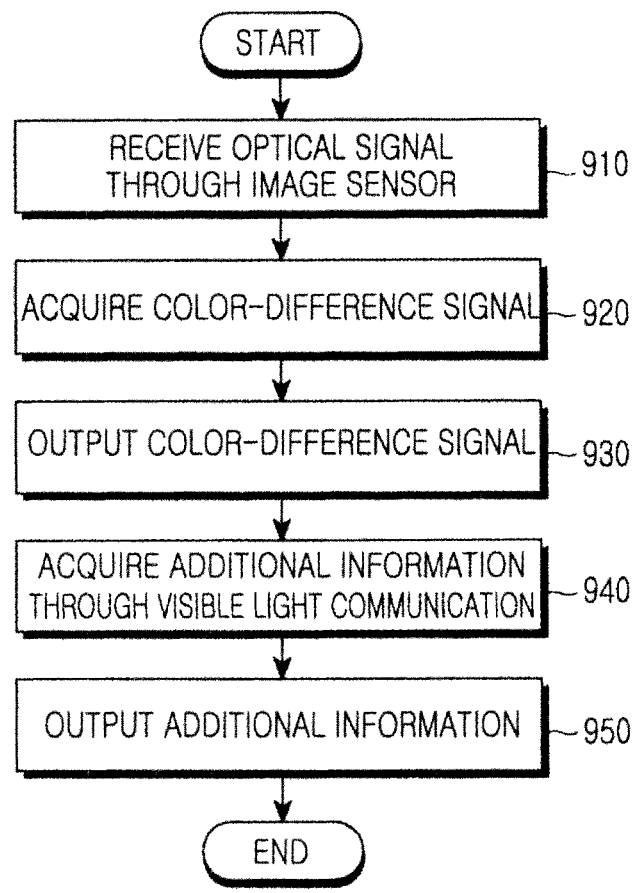
FIG. 5 is a flowchart illustrating a method for providing additional information of a video according to an exemplary embodiment of the present invention.

With reference to the foregoing components and FIG. 5, a description will now be made of a process of providing additional information of a video in an additional information providing apparatus according to an exemplary embodiment of the present invention.

When the user turns the image sensor module 610 prepared in the additional information providing apparatus toward the display device 540 prepared in the additional information transmission apparatus, the image sensor module 610 receives an optical signal generated from the display device 540 in the transmission apparatus, and converts the received optical signal into an electric signal in step 910.

Next, the display module 620 acquires a color-difference signal from a signal converted through a plurality of image sensors prepared in the image sensor module 610 in step 920, and outputs the acquired color-difference signal according to a size of its screen in step 930.

In step 940, the visible light receiving module 630 checks the data transmitted through visible light communication by applying to the VLC protocol the signal received through the plurality of image sensors in the image sensor module 610, and acquires the additional information that the additional information transmission apparatus transmits.

In step 950, the visible light receiving module 630 outputs the additional information through the display module 620.

It is also preferable that the additional information providing method further includes a process of selectively providing additional information to the user using a list of the additional information.

Figure 6:
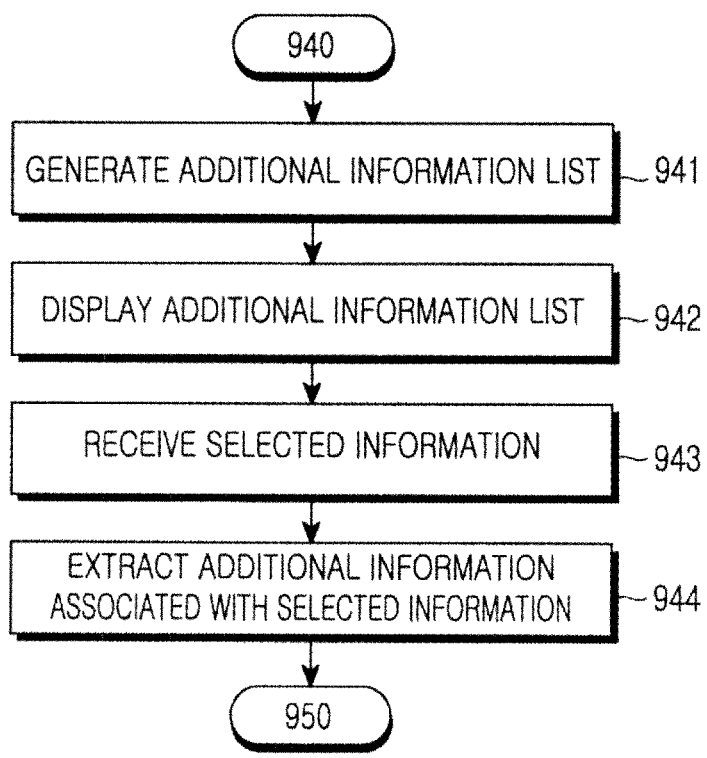
FIG. 6 is a flowchart illustrating a method for transmitting additional information of a video according to another exemplary embodiment of the present invention.

With reference to FIG. 6, a description will now be made of a process of selectively providing additional information to a user using a list of additional information in an additional information providing method according to an exemplary embodiment of the present invention.

In step 941, the additional information manager 640 receives a plurality of the additional information, generates a list of the additional information, and provides the list of the additional information to the display module 620.

In step 942, the display module 620 displays the list of the additional information.

In step 943, the controller 670 receives information indicating selected additional information in the list of the additional information, by means of the external input device 660 provided for interfacing with the user.

Next, in step 944, the additional information manager 640 extracts the selected additional information from the plurality of additional information stored in the memory 650, and provides it to the display module 620.

As is apparent from the exemplary foregoing description, with use of the additional information transmission apparatus and the additional information providing apparatus, the present invention can provide, through visible light communication, additional information associated with an object that the user has an interest in on the scene he or she is viewing, using BIFS information proposed by MPEG In addition, the present invention can effectively provide the additional information desired by individual users using the display device that provides videos to a plurality of users, like an electric bulletin board.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the invention has been shown and described with reference to certain preferred exemplary embodiments thereof, it will be understood by those skilled in the art that various changes in form and details may be made therein without departing from the spirit and scope of the invention as defined by the appended claims.

What is claimed is:

1. A method in an electronic device, comprising:
receiving a data packet including a video frame of a video and a plurality of additional information associated with a plurality of objects in the video frame;
obtaining, from the data packet, the video frame and the plurality of additional information including first additional information for a first object and a second additional information for a second object in the video frame, and decoding the video frame and the plurality of additional information;
generating a plurality of visible light signals from a plurality of LEDs of a display by encoding the obtained the plurality of additional information into a displayable format using Visible Light Communication (VLC); and
transmitting first visible light signals corresponding the first additional information and second visible light signals corresponding the second additional information to an external device using VLC,
wherein at least one part of the plurality of visible light signals include the first visible light signals and the second visible light signals,
wherein the first additional information is transmitted by VLC from first LEDs of the plurality of LEDs disposed in a first portion of the display where the first object is displayed, and the second additional information is transmitted by VLC from second LEDs of the plurality of LEDs disposed in a second portion of the display where the second object is displayed, and
wherein the external device receives an input selecting an entry from an additional information list displayed on the external device, and, in response to the input, identifies one of the first additional information and the second additional information from the plurality of visible light signals.

2. The method of claim 1, wherein each of the plurality of additional information comprises an identifier indicating a video frame where an object is included, information on a location where the object is provided within the video frame, and an identifier of the object, a name of the object, and detailed information of the object, and
wherein the plurality of visible light signals is captured by an image sensor of the external device to identify the plurality of additional information for display on a display of the external device from the plurality of visible light signals.

3. The method of claim 1, wherein each of the plurality of additional information is decoded and transmitted in response to receiving an input request via an input device.

4. The method of claim 1, wherein the first additional information comprising a first data packet represents associated with the first object on the first portion, and the second additional information comprising a second data packet associated with the second object on the second portion.

5. The method of claim 4, wherein the first additional information and the second additional information are transmitted via the respective first and second data packets regardless of interaction between the display and the external device.

6. The method according to claim 1, wherein transmitting the first additional information using the first portion comprises transmitting the additional information using at least a portion of the light emitting devices utilized to display the first object.

7. The method of claim 1, further comprising:
extracting audio data from the data packet and decoding the audio data.

8. The method of claim 1, further comprising:
storing the first or second additional information at the further device in a memory.

9. The method of claim 1, further comprises:
requesting and acquiring the plurality of additional information selectively.

10. A method in a mobile terminal, comprising:
capturing, by an image sensor, a video displayed on an external device including a plurality of visible light signals;
in response to capturing the video, obtaining a plurality of visible light signals transmitted from the external device using Visible Light Communication (VLC), wherein the plurality of visible light signals include first visible light signals corresponding to first additional information and second visible light signals corresponding to second additional information;
displaying an additional information list listing all available additional information indicated within the plurality of visible light signals on a display of the mobile terminal;
in response to detecting an input to the mobile terminal selecting the first additional information from the additional information list, identifying the first additional information associated with a first object of the video, and displaying the identified first additional information on the display; and
in response to detecting an input to the mobile terminal selecting the second additional information from the additional information list, identifying the second additional information associated with a second object of the video and displaying the identified second additional information on the display,
wherein the first visible light signals are transmitted from first LEDs disposed in a first portion of a display of the external device where the first object is displayed, and wherein the second visible light signals are transmitted from second LEDs disposed in a second portion of the display of the external device where the second object is displayed.

11. The method of claim 10, further comprising:
storing the first additional information and second additional information in a memory.

12. An apparatus, comprising:
a receiving module which receives a data packet including video frame of a video and a plurality of additional information associated with a plurality of objects;
a display;
at least one processor; and
a memory storing programming instructions executable by the at least one processor to cause the apparatus to:
obtain, from the data packet, the video frame and the plurality of additional information including first additional information for a first object and a second additional information for a second object displayed in the video frame, and decodes the video frame and the plurality of additional information, and
generate a plurality of visible light signals from a plurality of LEDs of the display by encoding the plurality of additional information into a displayable format using Visible Light Communication (VLC); and
transmit first visible light signals corresponding the first additional information and second visible light signals corresponding the second additional information to an external device using VLC,
wherein at least one part of the plurality of visible light signals include the first visible light signals and the second visible light signals,
wherein the first additional information is transmitted by VLC from first LEDs of the plurality of LEDs disposed in a first portion of the display where the first object is displayed, and the second additional information is transmitted by VLC from second LEDs of the plurality of LEDs disposed in a second portion of the display where the second object is displayed, and
wherein the external device receives an input selecting an entry from an additional information list displayed on the external device, and, in response to the input, identifies one of the first additional information and the second additional information from the plurality of visible light signals.

13. The apparatus of claim 12 wherein the programming instructions are further executable by the at least one processor to cause the apparatus to:
control for extracting audio data from the data packet, restoring an audio signal by decoding audio data, and outputting the restored audio signal, and wherein the video including the plurality of visible light signals is captured by an image sensor of the external device identify the plurality of additional information for display on a display of the external device from the plurality of visible light signals.

14. A mobile terminal, comprising:
an image sensor;
a local display;
at least one processor; and
a memory storing programming instructions executable by the at least one processor to cause the mobile terminal to:
capture, by the image sensor, a video displayed on an external device including a plurality of visible light signals;
in response to capturing the video, obtain a plurality of visible light signals transmitted from the external device using a Visible Light Communication (VLC), wherein the plurality of visible light signals include first visible light signals corresponding to first additional information and second visible light signals corresponding to second additional information,
display an additional information list listing all available additional information indicated within the plurality of visible light signals on the local display;
in response to detecting an input to the mobile terminal selecting the first additional information from the additional information list, identify the first additional information associated with a first object of the video and display the identified first additional information on the local display; and
in response to detecting an input to the mobile terminal selecting the second additional information from the additional information list, identify the second additional information associated with a second object of the video and display the identified second additional information on the local display,
wherein the first visible light signals are transmitted from first LEDs disposed in a first portion of a display of the external device where the first object is displayed, and
wherein the second visible light signals are transmitted from second LEDs disposed in a second portion of the display of the external device where the second object is displayed.

15. The mobile terminal of claim 14, wherein the first visible light signals and the second visible signals are modulated by a predetermined communication portocol.

16. The mobile terminal of claim 15, further comprising:
a memory for storing the first additional information and second additional information.

* * * * *